United States Patent [19]
Fu

[11] Patent Number: 6,030,909
[45] Date of Patent: Feb. 29, 2000

[54] LITHIUM ION CONDUCTIVE GLASS-CERAMICS AND ELECTRIC CELLS AND GAS SENSORS USING THE SAME

[75] Inventor: Jie Fu, Sagamihara, Japan

[73] Assignee: Kabushiki Kaisha Ohara, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/957,126

[22] Filed: Oct. 24, 1997

[30] Foreign Application Priority Data

Oct. 28, 1996 [JP] Japan .................................. 8-302564
Feb. 14, 1997 [JP] Japan .................................. 9-046986
Sep. 25, 1997 [JP] Japan .................................. 9-278106
Sep. 29, 1997 [JP] Japan .................................. 9-281274

[51] Int. Cl.$^7$ .......................... C03C 10/00; C03C 10/02
[52] U.S. Cl. ................. 501/10; 204/424; 252/520.2; 252/520.21; 252/520; 252/22; 252/521.3; 252/521.5; 429/319; 429/322; 501/4; 501/5
[58] Field of Search ................. 501/4, 5, 10; 429/319, 429/322; 204/424; 252/520.2, 520.21, 520.22, 521.3, 521.5

[56] References Cited

U.S. PATENT DOCUMENTS 4,009,092 2/1977 Taylor .................................. 204/242

OTHER PUBLICATIONS

WPIDS Abstract No. 90–316587, abstract of Japanese Patent Specification No. 02–225310, Sep. 1990.
WPIDS Abstract No. 92–238190, abstract of Japanese Patent Specification No. 04–160011, Jun. 1992.
Imanaka N et al.; Solid State Ionics, vol. 62, No. 3/4, Aug. 1993, pp. 167–171, XP000415545.
Patent Abstracts of Japan, vol. 097, No. 010, Oct. 31, 1997 & JP 09142874 A (Ohara Inc.), Jun. 3, 1997.
Patent Abstracts of Japan, vol. 017, No. 513 (C–111), Sep. 16, 1993 & JP 05 139781 A (Res Dev Corp of Japan), Jun. 8, 1993.
H. Aono et al.; Bulletin of the Chemical Society of Japn, vol. 65, No. 8, 1992, Tokyo JP, pp. 2200–2204, XP002057073.
Shi–Chun Li et al.; Solid State Ionics, vol. 28–30, No. Part 02, Sep. 1, 1988, pp. 1265–1270, XP000169535.
Cretin M. et al.; Journal of the European Ceramic Society, vol. 15, No. 11, May 1995, pp. 1149–1156 XP004047298.
Zu–xiang Lin et al.; Solid State Ionics, vol. 18/19, Jan. 1986, pp. 549–552, XP002057074.

*Primary Examiner*—Anthony Green
*Attorney, Agent, or Firm*—Hedman, Gibson & Costigan, P.C.

[57] ABSTRACT

There are provided glass-ceramics having a high lithium ion conductivity which include in mol %:

| | |
|---|---|
| $P_2O_5$ | 35–40% |
| $SiO_2$ | 0–15% |
| $GeO_2 + TiO_2$ | 25–50% |
| in which $GeO_2$ | 0 <–50% |
| and $TiO_2$ | 0–<50% |
| $ZrO_2$ | 0–10% |
| $M_2O_3$ (where M is one or two selected from the group consisting of Al and Ga) | 0.5–15% |
| $Li_2O$ | 10–25% | and containing $Li_{1+X}M_X(Ge_{1-Y}Ti_Y)_{2-X}(PO_4)_3$ (where 0<X<0.8 and 0<Y<1.0) as a main crystal phase. There are also provided glass-ceramics having a high lithium ion conductivity which include in mol %

| | |
|---|---|
| $P_2O_5$ | 32–40% |
| $SiO_2$ | 7–14% |
| $TiO_2$ | 38–45% |
| $Li_2O$ | 10–18% | and containing $Li_{1+X}Ti_2Si_XP_{3-X}O_{12}$ (where X>0) as a main crystal phase. There are also provided solid electrolyte for an electric cell and a gas sensor using the lithium ion conductive glass-ceramics, and a solid electric cell and a gas sensor using the glass-ceramics.

18 Claims, 5 Drawing Sheets

LITHIUM ION CONDUCTIVE GLASS-CERAMICS AND ELECTRIC CELLS AND GAS SENSORS USING THE SAME

BACKGROUND OF THE INVENTION

This invention relates to a lithium ion conductive glass-ceramics suitable for use as wholly solid electric cells, gas sensors and electrochemical devices of various types, and electric cells and gas sensors using such glass-ceramics.

Recent development in electronics has brought about high-performance electronic devices of a compact and light-weight design and, as a power source of such electronic devices, development of an electric cell of a high energy density and a long life is strongly desired for.

Lithium has the highest oxidation-reduction potential of Li/Li$^+$ of all metal elements and has the smallest mass per 1 mol and, therefore, lithium cell can provide a higher energy density than other types of cells. Moreover, if a lithium ion conductive solid electrolyte is used, this electrolyte can be made very thin and, therefore, a cell of a thin film can be formed and increase in energy density per unit volume can thereby be realized.

A lithium ion cell which has been realized to date uses an organic electrolyte solution as its electrolyte and this makes it difficult to achieve a cell of a compact design such as a thin film design. This lithium ion cell has additional disadvantages that it has likelihood of leakage of electrolyte solution and likelihood of spontaneous combustion. If this lithium ion cell is replaced by a cell employing an inorganic solid electrolyte, a wholly solid cell of a high reliability will be realized.

Moreover, carbon dioxide gas produced by combustion of fossil fuel is a main cause of a hothouse effect which has recently become a serious problem and it has become necessary to incessantly watch the concentration of carbon dioxide gas. Therefore, establishment of a system for detecting carbon dioxide gas is a matter of increasing importance for the maintenance of a comfortable life in the future human society.

Carbon dioxide gas detection systems which are currently in use are generally of a type utilizing absorption of infrared ray. These systems however are large and costly and besides are very susceptible to contamination. For these reasons, studies have recently been actively made to develop a compact carbon dioxide gas sensor using a solid electrolyte. Particularly, many reports have been made about studies using a lithium ion solid electrolyte.

For realizing such gas sensor using solid electrolyte, development of a solid electrolyte which is highly conductive, chemically stable and sufficiently heat proof is indispensable.

Among known electrolyes, Li$_3$N single crystal (Applied Physics letter, 30(1977) P621–22), LiI—Li$_2$S—P$_2$S$_5$ (Solid State Ionics, 5(1981) P663), LiI—Li$_2$S—SiS$_4$ (J. Solid State Chem. 69 (1987) P252) and LiI—Li$_2$S—B$_2$S$_3$ (Mat. Res. Bull., 18(1983) 189) glasses have high conductivity of 10$^{-3}$S/cm or over. These materials, however, have the disadvantages that preparation and handling of these materials are difficult and these materials are not sufficiently heat proof. Particularly, these materials have the fatal disadvantage that decomposition voltage of these materials is so low that, when they are used for an electrolyte of a solid cell, a sufficiently high terminal voltage cannot be obtained.

An oxide lithium solid electrolyte does not have the above described disadvantages and has a decomposition voltage which is higher than 3V and, therefore, it has possibility of usage as a wholly solid lithium cell if it exhibits a high conductivity at room temperature. It is known in the art that conductivity in an oxide glass can be increased by increasing lithium ion concentration. However, there is limitation in increase in the lithium ion concentration even if rapid quenching is employed for glass formation and conductivity of this glass at room temperature is below 10$^{-6}$S/cm at the highest.

Japanese Patent Application Laid-open Publication No. Hei-8-239218 discloses a gas sensor using a thin film of a lithium ion conductive glass. The conductivity of this lithium ion conductive glass thin film is between 1.7×10$^{-7}$ and 6.1×10$^{-7}$ S/cm. This is not a sufficiently high value and a solid electrolyte having a higher conductivity is desired for.

There are many reports about oxide ceramics having high conductivity. For example, Li$_4$GeO$_4$—Li$_3$VO$_4$ exhibits conductivity of 4×10$^{-5}$S/cm at room temperature (Mat. Res. Bull. 15 (1980) P1661), Li$_{1+X}$M$_X$Ti$_{2-X}$(PO$_4$)$_3$ (M=Al, Ga, Cr etc.) exhibits conductivity of 7×10$^{-4}$S/cm at room temperature (J. Electrochem. Soc., 137(1990) P1023) and Li$_{1+X}$Al$_X$Ge$_{2-X}$(PO$_4$)$_3$ exhibits conductivity of 3×10$^{-4}$S/cm at room temperature (Proceedings of 8th international meeting on lithium batteries, Jun. 6–21, 1996, Nagoya, Japan, P316–317). Oxide ceramics are superior in conductivity to oxide glasses but have the disadvantages that they require a complicated and troublesome process for manufacturing and that they are difficult to form, particularly to a thin film.

In short, the prior art lithium ion solid electrolytes have the problems that they are either low in coductivity, hard to handle, hard to form to a compact design such as a thin film.

It is, therefore, an object of the invention to provide glass-ceramics which have solved these problems and exhibit a high lithium ion conductivity at room temperature.

It is another object of the invention to provide an lithium cell and a gas sensor of a high performance by utilizing such glass-ceramics.

SUMMARY OF THE INVENTION

As described above, ceramics exhibit conductivity of 10$^{-4}$ S/cm or over at room temperature. These ceramics, however, have pores and a large grain boundary which can not be eliminated completely and existence of these pores and grain boundary results in a decrease in conductivity. If, therefore, glass-ceramics including the above crystal are provided, there will be no pores and the grain boundary will be improved and, as a result, a solid electrolyte having a higher conductivity is expected to be provided. Besides, glass-ceramics which share a feature of glass can be easily formed into various shapes including a thin film by utilizing this feature of glass. For these reasons, glass-ceramics are considered to have practical advantages over ceramics made by sintering.

As a result of studies and experiments made by the inventor of the present invention on the basis of the above described basic concept, the inventor has succeeded in obtaining glass-ceramics having a high lithium ion conductivity in the order of 10$^{-4}$S/cm or over at room temperature by producing glasses including ingredients of P$_2$O$_5$, SiO$_2$, GeO$_2$, TiO$_2$, ZrO$_2$, M$_2$O$_3$ (where M is one or two selected from the group consisting of Al and Ga) and Li$_2$O and causing a crystal phase of a conductive crystal Li$_{1+X}$M$_X$Ge$_{1-Y}$Ti$_Y$)$_{2-X}$(PO$_4$)$_3$ (where 0<X≦0.8 and 0≦Y<1.0) to grow from the glasses by heat treating these glasses. The inventor has also found that a lithium cell and a gas sensor using the glass-ceramics exhibit excellent characteristics.

Lithium ion conductive glass-ceramics achieving the above described object of the invention comprise in mol %:

| | |
|---|---|
| $P_2O_5$ | 35–40% |
| $SiO_2$ | 0–15% |
| $GeO_2 + TiO_2$ | 25–50% |
| in which $GeO_2$ | 0 <–50% |
| and $TiO_2$ | 0–<50% |
| $ZrO_2$ | 0–10% |
| $M_2O_3$ (where M is one or two selected from the group consisting of Al and Ga) | 0.5–15% |
| $Li_2O$ | 10–25% | and containing $Li_{1+X}M_X(Ge_{1-Y}Ti_Y)_{2-X}(PO_4)_3$ (where $0<X\leq0.8$ and $0\leq Y<1.0$) as a main crystal phase.

In one aspect of the invention, said glass-ceramics comprise in mol %:

| | |
|---|---|
| $P_2O_5$ | 35–40% |
| $SiO_2$ | 0–15% |
| $GeO_2 + TiO_2$ | 25–45% |
| in which $GeO_2$ | 0<–45% |
| and $TiO_2$ | 0–<45% |
| $ZrO_2$ | 0–10% |
| $Al_2O_3$ | 0.5–15% |
| $Li_2O$ | 10–25% | and containing $Li_{1+X}Al_X(Ge_{1-Y}Ti_Y)_{2-X}(PO_4)_3$ (where $0<X\leq0.8$ and $0\leq Y<1.0$) as a main crystal phase.

In another aspect of the invention, said glass-ceramics comprise in mol %:

| | |
|---|---|
| $P_2O_5$ | 35–40% |
| $SiO_2$ | 0–15% |
| $GeO_2 + TiO_2$ | 25–45% |
| in which $GeO_2$ | 0<–45% |
| and $TiO_2$ | 0–<45% |
| $ZrO_2$ | 0–10% |
| $Ga_2O_3$ | 0.5–15% |
| $Li_2O$ | 10–25% | and containing $Li_{1+X}Ga_X(Ge_{1-Y}Ti_Y)_{2-X}(PO_4)_3$ (where $0<X\leq0.8$ and $0\leq Y<1.0$) as a main crystal phase.

The inventor of the present invention has further succeeded in obtaining glass-ceramics having a high lithium ion conductivity in the order of $10^{-4}$S/cm or over at room temperature by producing glasses including ingredients of $P_2O_5$, $SiO_2$, $TiO_2$ and $Li_2O$ and causing a crystal phase of a conductive crystal $Li_{1+X}Ti_2Si_XP_{3-X}O_{12}$ to grow from the glasses by heat treating these glasses. The inventor has found that a lithium cell and a gas sensor using these glass-ceramics exhibit excellent characteristics.

Therefore, in another aspect of the invention, there are provided lithium ion conductive glass-ceramics comprising in mol %:

| | |
|---|---|
| $P_2O_5$ | 32–40% |
| $SiO_2$ | 7–14% |
| $TiO_2$ | 38–45% |
| LiO | 10–18% | and containing $Li_{1+X}Ti_2Si_XP_{3-X}O_{12}$ (where X>0) as a main crystal phase.

According to the invention, there are provided lithium ion conductive glass-ceramics which exhibit a very high lithium ion conductivity in the order of $10^{-4}$S/cm or over at room temperature. In addition to having the high conductivity, the glass-ceramics made according to the invention have such an excellent formability that they can be easily formed into various shapes including a thin film, and they are thermally and chemically stabel so that they are suitable for use as electrolytes of wholly solid cells, sensors and other various electrochemical devices.

In another aspect of the invention, there is provided a solid electrolyte for an electric cell characterized in that one of the above described lithium ion conductive glass-ceramics is used as said solid electrolyte.

In another aspect of the invention, there is provided a solid electric cell characterized in that one of the above described lithium ion conductive glass-ceramics is used as a solid electrolyte.

In another aspect of the invention, there is provided a solid electrolyte for a gas sensor characterized in that one of the above described lithium ion conductive glass-ceramics is used as said electrolyte.

In still another aspect of the invention, there is provided a gas sensor characterized in that one of the above described lithium ion conductive glass-ceramics is used as a solid electrolyte.

DETAILED DESCRIPTION OF THE INVENTION

In the description to follow, the compositions of the glass-ceramics made according to the invention are expressed on the basis of compositions of oxides as in their base glasses. Reasons for selecting the above described content ranges of the respective ingredients of the respective systems and methods for manufacturing these glass-ceramics of the respective systems will now be described.

1. The glass-ceramics of the $Li_{1+X}M_X(Ge_{1-Y}Ti_Y)_{2-X}(PO_4)_3$ crystal phase In the case of the glass-ceramics according to the invention having the $Li_{1+X}M_X(Ge_{1-Y}Ti_Y)_{2-X}(PO_4)_3$ (where $0<X\leq0.8$ and $0\leq Y<1.0$) crystal phase, the above described composition ranges have been selected because, within these composition ranges, dense glass-ceramics containing this crystal phase as a main crystal phase and exhibiting a high lithium ion conductivity at room temperature which was never attained in the prior art ceramics were obtained by heat treating base glasses of the same composition ranges. It has been found that the same crystal phase can be precipitated also in a composition range outside of the above described composition ranges but the ratio of this crystal is so low that lithium ion conductivity of this glass-ceramic is not sufficiently high for a practical use.

In the above described ingredients, the $M_2O_3$ ingredient (M is one or two selected from the group consisting of Al and Ga) is of a particular importance for improving the melting property and thermal stability of the glass. By the addition of 0.5–15% of the $M_2O_3$ ingredient (M=Al, Ga), the melting property and thermal stability of the glass produced are improved remarkably and, surprisingly, the glass-ceramics obtained by heat treating this glass exhibit a high conductivity in the order of $10^{-4}$S/cm or over in a broad composition range. If the $M_2O_3$ ingredient is below 0.5%, glassification is possible but the melting property and thermal stability of the glass are insufficient whereas if the amount of this ingredient exceeds 15%, the melting property also is deteriorated and the conductivity of glass-ceramics obtained after heat treatment drops significantly to the order of $10^{-6}$S/cm or below. A preferable content range of the $M_2O_3$ ingredient is 1–14% and a more preferable content range of this ingredient is 3–12%.

The $GeO_2$ ingredient is indispensable for forming glass and constituting the conductive crystal phase. As the amount of $GeO_2$ increases, it becomes easier to form the glass. If the amount of this ingredient is below 25%, its effect is insufficient for obtaining the desired property whereas if the amount of this ingredient exceeds 50%, precipitation of the conductive crystal phase becomes difficult. $GeO_2$ can be replaced by $TiO_2$ up to the replacement ratio of nearly 100%. By the replacement, the lithium ion conductivity improves. On the basis of these factors, the amount of $GeO_2$ must be 0<–50% and the amount of $TiO_2$ must be 0–<50% and the amount of $GeO_2+TiO_2$ must be 25–50%. Preferable content ragnes are $GeO_2$=0<–45%, $TiO_2$=0–<45% and $GeO_2+TiO_2$=25–45%. More preferable content ranges are $GeO_2$=0<–40%, $TiO_2$=0–<40% and $GeO_2+TiO_2$=28–40%.

The $SiO_2$ ingredient improves thermal stability of the base glass and contributes to solid solution of $Si^{+4}$ ion to the crystal phase and also to improvement of the lithium ion conductivity. If, however, the amount of this ingredient exceeds 15%, the conductivity decreases rather than increases and therefore the amount of this ingredient should not exceed 15%. A preferable content range of this ingredient is 13% or below and a more preferable content range is 10% or below.

The $ZrO_2$ ingredient is effective for enhancing precipitation of the crystal phase. If, however, the amount of this ingredient exceeds 10%, resistivity of the base glass to devitrification drops significantly and production of a homogeneous base glass becomes difficult and, besides, the conductivity drops sharply. Therefore, the amount of this ingredient should not exceed 10%. A preferable content range of this ingredient is 8% or below and a more preferable content range is 5% or below.

Al or Ga in the composition may partially be replaced by one or more of trivalent metals such as B, In, Sc, Fe and Cr or by one or more of divalent metals such as Mg, Ca, Sr. Ba and Zn. The amount of the ingredient replaced should however not exceed 10 mol%. If the amount of the ingredient replaced exceeds it, it becomes difficult to prepare the base glass or the conductivity of the glass-ceramic drops significantly.

For improving the melting property of the glass further, other ingredient such as $As_2O_3$, $Sb_2O_3$, $Ta_2O_3$, CdO or PbO may be added. The amount of such ingredient however should not exceed 3%. If the addition of the ingredient exceeds 3%, the conductivity decreases with the amount of addition.

A method for manufacturing the lithium ion conductive glass-ceramics of this crystal phase will now be described.

Starting materials are weighed at a predetermined ratio and mixed uniformly and the mixed materials are thereafter put in a platinum crucible and heated and melted in an electric furnace. First, gas components coming from the raw materials are evaporated at 700° C. and then the temperature is raised to 1300° C. to 1450° C. and the materials are melted at this temperature for about one to two hours. Then, the melt is cast onto a stainless steel plate to form sheet glass. The resultant glass is subjected to heat treatment within the temperature range from 600° C. to 1000° C. for twelve to twenty-four hours and lithium ion conductive glass-ceramics containing $Li_{1+x}M_x(Ge_{1-y}Ti_y)_{2-x}(PO_4)_3$ and exhibiting a high lithium ion conductivity thereby is provided.

2. The glass-ceramics of the $Li_{1+x}Ti_2Si_xP_{3-x}O_{12}$ (where X>0) crystal phase In the Bulletin of the Chemical Society of Japan (1978) P2559, it is reported that the composition constituting the $LiTi_2P_3O_{12}$ crystal phase is not glassified. It is reported that the four-ingredient system $Li_2O$—$TiO_2$—$SiO_2$—$P_2O_5$ can be glassified but its range in detail is not reported yet. Neither is there a report about glass-ceramics made from these compositions for the purpose of providing a high lithium ion conductivity.

As a result of studying the glass forming ability of the $Li_2O$—$TiO_2$—$SiO_2$—$P_2O_5$ it has been found that glassification is possible within the specific composition range of $P_2O_5$=32–40%, $SiO_2$=7–14%, $TiO_2$=38–45%, and $Li_2O$=10–18% (in mol%) and that glass-ceramics which precipitate, as a result of heat treatment of the base glass within this composition range, the $Li_{1+x}Ti_2Si_xP_{3-x}O_{12}$ (X>0) crystal phase surprisingly has a lithium ion conductivity which is significantly higher than the glass-ceramics which have been reported to date. Further, an electric cell which uses these glass-ceramics exhibits discharge current density which is higher than the prior art cells. Likewise, a gas sensor which uses these glass-ceramics exhibits a better sensitivity than the prior art gas sensors.

There is a glassifying region other than the above described composition range but glass-ceramics of the compositions in this region produced after heat treatment do not exhibit a high conductivity. For example, in case the amount of $Li_2O$ ingredient exceeds 30 mol%, glass can be produced easily but, after heat treatment, a large amount of a non-conductive crystal phase has been precipitated in addition to the $Li_{1+x}Ti_2Si_xP_{3-x}O_{12}$ (X>0) crystal phase and, as a result, the conductivity drops to a value below $10^{-7}$ S/cm. On the basis of results of these experiments, the composition range of the glass-ceramics of the invention has been determined as described above.

A preferable composition range is one consisting of $P_2O_5$=35–40%, $SiO_2$=8–13%, $TiO_2$=40–45% and $Li_2O$=10–15% (in mol%). A more preferable composition range is one consisting of $P_2O_5$=35–38%, $SiO_2$=8–12%, $TiO_2$=40–45% and $Li_2O$=10–14% (in mol%).

Ti may partially be replaced by one or more of quadrivalent metals such as Zr, Hf, Ge and Sn or one or more of trivalent metals such as B, In, Sc, Fe and Cr or one or more of divalent metals such as Mg and Zn. The amount of the ingredient replaced however should not exceed 5 mol%. If the amount of the ingredient replaced exceeds 5 mol%, it becomes difficult to produce the base glass or the conductivity drops sharply.

For improving the melting property of the glass further, other ingredient such as $As_2O_3$, $Sb_2O_3$, $Ta_2O_3$, CdO or PbO may be added. The amount of such ingredient however should not exceed 3 mol%. If the addition of the ingredient exceeds 3 mol%, the conductivity decreases with the amount of addition.

A method for manufacturing the lithium ion conductive glass-ceramics of this crystal phase will now be described.

Starting materials are weighed at a predetermined ratio and mixed uniformly and the mixed materials are thereafter put in a platinum crucible and heated and melted in an electric furnace. First, gas components coming from the raw materials are evaporated at 700° C. and then the temperature is raised to 1450° C. to 1500° C. and the materials are melted at this temperature for about one to two hours. Then, the melt is cast onto a stainless steel plate to form sheet glass. The resultant glass is subjected to heat treatment within the temperature range from 900° C. to 1100° C. for about fifteen hours by using the one stage heat treatment method and lithium ion conductive glass-ceramics containing $Li_{1+x}Ti_2Si_xP_{3-x}O_{12}$ as a main crystal phase and exhibiting a high lithium ion conductivity thereby is provided.

BRIEF DESCRIPTION OF THE DRAWINGS

In the accompanying drawings.

EXAMPLES

Examples of the glass-ceramics made according to the invention will now be described. It should be noted that these examples are illustrative only and the scope of the invention in no way is restricted by these examples.

1. Examples of the glass-ceramics of the $Li_{1+x}M_x(Ge_{1-Y}Ti_Y)_{2-x}(PO_4)_3$ crystal phase

Example 1

As starting materials, $NH_4H_2PO_4$, $GeO_2$, $Al(OH)_3$ and $Li_2CO_3$ were used. These starting materials were weighed to constitute a composition of 37.5% $P_2O_5$, 35.0% $GeO_2$, 7.5% $Al_2O_3$ and 20.0% $Li_2O$ in mol %. The materials were mixed uniformly and then put in a platinum crucible and heated and melted in an electric furnace. First, $CO_2$, $NH_3$ and $H_2O$ coming from the raw materials were evaporated at 700° C. Then the temperature was raised to 1300° C. and the materials were melted by heating them at this temperature for 1.5 hour. Thereafter, the melt was cast onto a stainless steel plate to form a uniform sheet glass. The glass was annealed at 520° C. for two hours for removing thermal stress of the glass.

Figure 1:
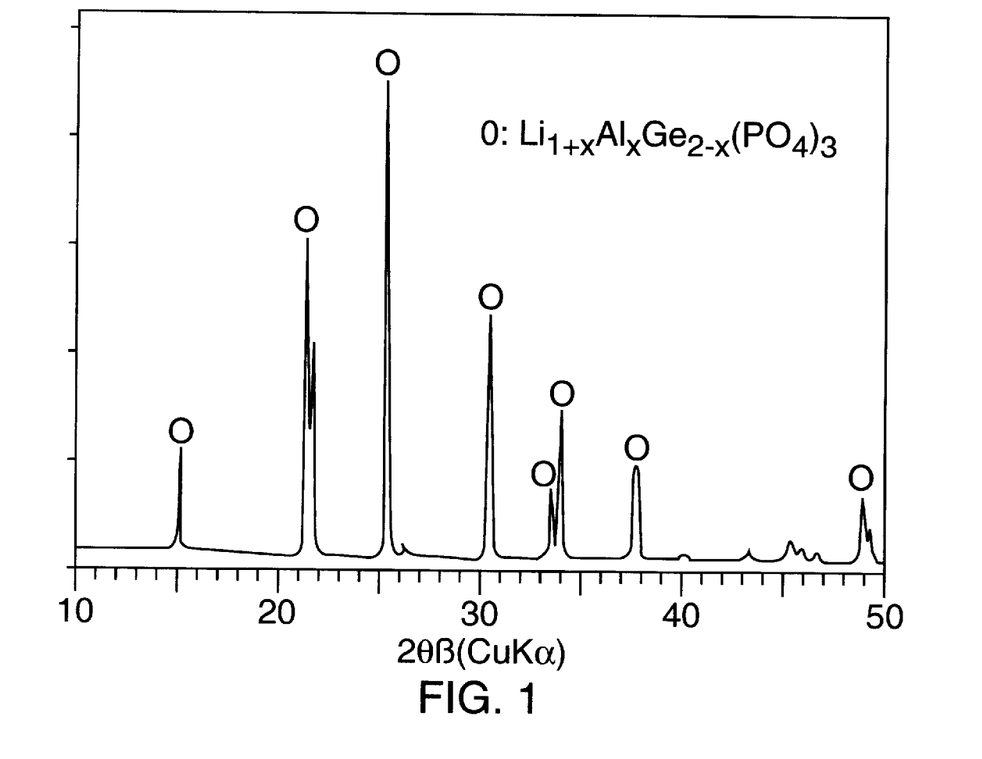
FIG. 1 is a graph showing an X-ray diffraction pattern of Example 1.

The glass thus produced was cut into specimens each having the size of 20×20 mm. The specimens of glass were polished on both surfaces and subjected to heat treatment at 750° C. for twelve hours and, as a result, a dense glass-ceramic was produced. The crystal phase which precipitated in the specimens was determined by the powder X-ray diffraction method. As a result, it was found that the precipitated crystal phase was $Li_{1+x}Al_xGe_{2+x}(PO_4)_3$. An X-ray diffraction pattern of this glass-ceramic is shown in FIG. 1. This glass-ceramic exhibited a high conductivity of $4.0 \times 10^{-4}$ S/cm at room temperature.

Example 2

As starting materials, $NH_4H_2PO_4$, $GeO_2$, $Ga_2O_3$ and $Li_2CO_3$ were used. These starting materials were weighed to constitute a composition of 37.5 % $P_2O_5$, 40.0% $GeO_2$, 5.0% $Ga_2O_3$ and 17.5% $Li_2O$ in mol %. The materials were mixed uniformly and then put in a platinum crucible and heated and melted in an electric furnace. First, $CO_2$, $NH_3$ and $H_2O$ coming from the raw materials were evaporated at 700° C. Then the temperature was raised to 1300° C. and the materials were melted by heating them at this temperature for 1.5 hour. Thereafter, the melt was cast onto a preheated stainless steel plate to form a uniform sheet glass. The glass was annealed at 510° C. for two hours for removing thermal stress of the glass.

The glass thus produced was cut into specimens each having the size of 20×20 mm. The specimens of glass were polished on both surfaces and subjected to heat treatment at 800° C. for twelve hours and, as a result, a dense glass-ceramic was produced. The crystal phase which precipitated in the specimens was determined by the powder X-ray diffraction method. As a result, it was found that the precipitated crystal phase was $Li_{1+x}Ga_xGe_{2-x}(PO_4)_3$. This glass-ceramic exhibited a high conductivity of $2.0 \times 10^{-4}$ S/cm at room temperature.

Example 3

As starting materials, $NH_4H_2PO_4$, $GeO_2$, $TiO_2$, $Al_2O_3$ and $Li_2CO_3$ were used. These starting materials were weighed to constitute a composition of 37.5% $P_2O_5$, 30.0% $GeO_2$, 10% $TiO_2$, 5.0% $Al_2O_3$ and 17.5% $Li_2O$ in mol %. The materials were mixed uniformly and then put in a platinum crucible and heated and melted in an electric furnace. First, $CO_2$, $NH_3$ and $H_2O$ coming from the raw materials were evaporated at 700° C. Then the temperature was raised to 1400° C. and the materials were melted by heating them at this temperature for 1.5 hour. Thereafter, the melt was cast onto a preheated stainless steel plate to form a uniform sheet glass. The glass was annealed at 540° C. for two hours for removing thermal stress of the glass.

The glass thus produced was cut into specimens each having the size of 20×20 mm. The specimens of glass were polished on both surfaces and subjected to heat treatment at 850° C. for twelve hours and, as a result, a dense glass-ceramic was produced. The crystal phase which precipitated in the specimens was determined by the powder X-ray diffraction method. As a result, it was found that the precipitated crystal phase was $Li_{1+x}Al_x(Ge_{2-Y}Ti_Y)_{2-x}(PO_4)_3$. This glass-ceramic exhibited a high conductivity of $2.0 \times 10$ S/cm at room temperature.

Examples 4 to 10

Specimens of Examples 4 to 10 were prepared by employing a method similar to the one employed in preparing the glass-ceramic of Example 2. Compositions and conductivity at room temperature of the respective Examples are shown in the following Tables 1 and 2.

The conductivity of the glass-ceramics was measured within a range from $10^{-2}$–$3 \times 10^{+7}$ Hz by the ac impedance. Resistance of the specimens (sum of grain resistance and grain boundary resistance) was determined from the Cole-Cole Plot and the conductivity was calculated by the equation a $\sigma=(t/A)(1/R)$ (where σ is conductivity, t is thickness of the specimen, A is electrode area and R is resistance of the specimen).

TABLE 1

| Example No. | 1 | 2 | 3 | 4 | 5 |
|---|---|---|---|---|---|
| $P_2O_5$ (mol %) | 37.5 | 37.5 | 37.5 | 37.5 | 37.5 |
| $SiO_2$ (mol %) | | | | | |
| $GeO_2$ (mol %) | 35.0 | 40.0 | 30.0 | 37.5 | 40.0 |
| $TiO_2$ (mol %) | | | 10.0 | | |
| $ZrO_2$ (mol %) | | | | | |
| $Al_2O_3$ (mol %) | 7.5 | | 5.0 | 4.5 | 5.0 |
| $Ga_2O_3$ (mol %) | | 5.0 | | 2.0 | |

TABLE 1-continued

| Example No. | 1 | 2 | 3 | 4 | 5 |
|---|---|---|---|---|---|
| $Li_2O$ (mol %) | 20.0 | 17.5 | 17.5 | 18.5 | 17.5 |
| Conductivity ($\times 10^{-4}$ S/cm) | 4.0 | 2.0 | 3.5 | 1.5 | 3.0 |

TABLE 2

| Example No. | 6 | 7 | 8 | 9 | 10 |
|---|---|---|---|---|---|
| $P_2O_5$ (mol %) | 39.0 | 29.0 | 39.0 | 33.0 | 33.0 |
| $SiO_2$ (mol %) | | | | 5.0 | 8.0 |
| $GeO_2$ (mol %) | 37.5 | 33.0 | 35.5 | 37.5 | 11.0 |
| $TiO_2$ (mol %) | | | | | 30.0 |
| $ZrO_2$ (mol %) | | | | 2.0 | |
| $Al_2O_3$ (mol %) | | 11.0 | 6.0 | 4.5 | 5.0 |
| $Ga_2O_3$ (mol %) | 9.0 | | 4.0 | | |
| $Li_2O$ (mol %) | 14.5 | 17.0 | 15.5 | 18.0 | 14.0 |
| Conductivity ($\times 10^{-4}$ S/cm) | 1.2 | 2.0 | 1.5 | 2.5 | 5.0 |

Example 11

Figure 2:
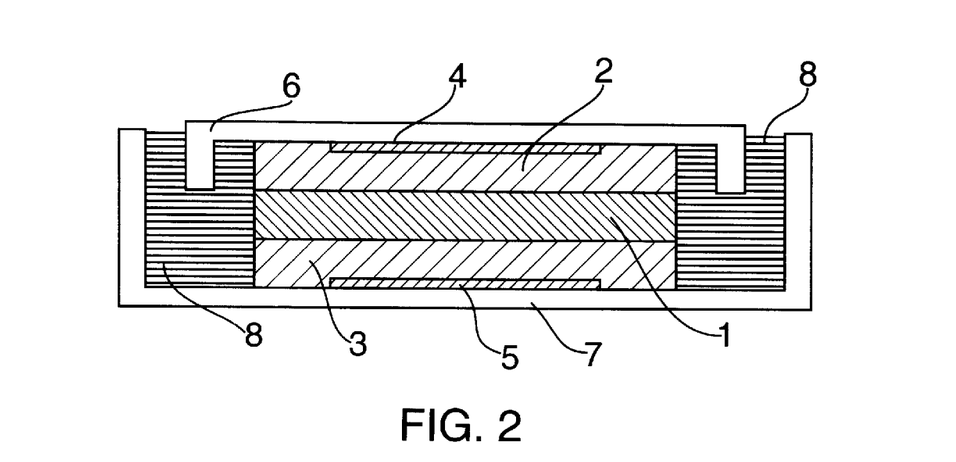
FIG. 2 is a sectional view of an example of a lithium cell using a lithium ion concuctive solid electrolyte of Example 4.

As a typical example of a lithium electric cell, an example of flat type cell using the lithium ion conductive glass-ceramic of Example 4 as a solid electrolyte is shown in the sectional view of FIG. 2. The cell is composed of a negative electrode container 6, a negative electrode collector 4 constructed of a conductive thin film or a thin film made of aluminum or stainless steel, a negative electrode 2, a lithim ion conductive glass-ceramic layer 1, a positive electrode 3, a positive electrode collector 5 constructed of a conductive thin film or a thin film made of aluminum or stainless steel, a positive electrode container 7 and an insulating filler 8 made of an insulating material such as polypropylene. The positive and negative electrodes 2 and 3 are received in the case formed by the positive and negative electrode containers 6 and 7 in such a manner that these electrodes 2 and 3 oppose each other through the lithim ion conductive glass-ceramic layer 1. The positive electrode 3 is connected to the positive electrode container 7 through the positive electrode collector 5 and the negative electrode 2 is connected to the negative electrode container 6 through the negative electrode collector 4. Chemical energy produced in the cell can be collected as electric energy from terminals of the negative electrode container 6 and the positive electrode container 7.

In constructing the cell made according to the invention, various other materials which are conventionally used for forming a cell can be used except for the solid electrolyte portion.

The lithium ion conductive glass-ceramic layer must be sufficiently thin, i.e., 1 mm or less and preferably 0.5 mm or less. Many reports and proposals have been made about the material of the positive electrode 3 and it is typically made of $LiCoO_2$ or $Li_{1+x}V_3O_8$. Likewise, reports and proposals have been made about the material of the negative electrode 2 and it is typically made of $Li_4Ti_5O_{12}$ or carbon.

As to the positive and negative electrodes 2 and 3 formed on the opposite surfaces of the lithium ion conductive glass-ceramic layer 1 and the collectors 4 and 5 formed in the negative and positive electrodes 2 and 3, these component parts may be preformed respectively and stacked one after another to a composite cell. Alternatively, the positive and negative electrodes 2 and 3 and the collectors 4 and 5 may be formed sequentially by any of suitable known methods including ion spattering, CVD, screen printing, coating, sol-gel method, ion plating, ion beam evaporation and electron beam evaporation.

As a comparative example, a cell is composed in the same manner as in the above example except that the solid electrolyte is formed by mixing 1.7 mol of titanium oxide, 0.7 mol of lithium carbonate, 3.0 mol of ammonium phosphate and 0.2 mol of aluminum oxide in an agate mortar, press-forming the mixture to pellets and sintering the pellets at 900° C. for two hours, crushing the sintered pellets again in an agate mortar, press-forming the crushed material which has passed a shieve of 400 mesh to pellets again, sintering the pellets at 1000° C. for two hours and processing the sintered pellets to a thin plate.

Figure 4:
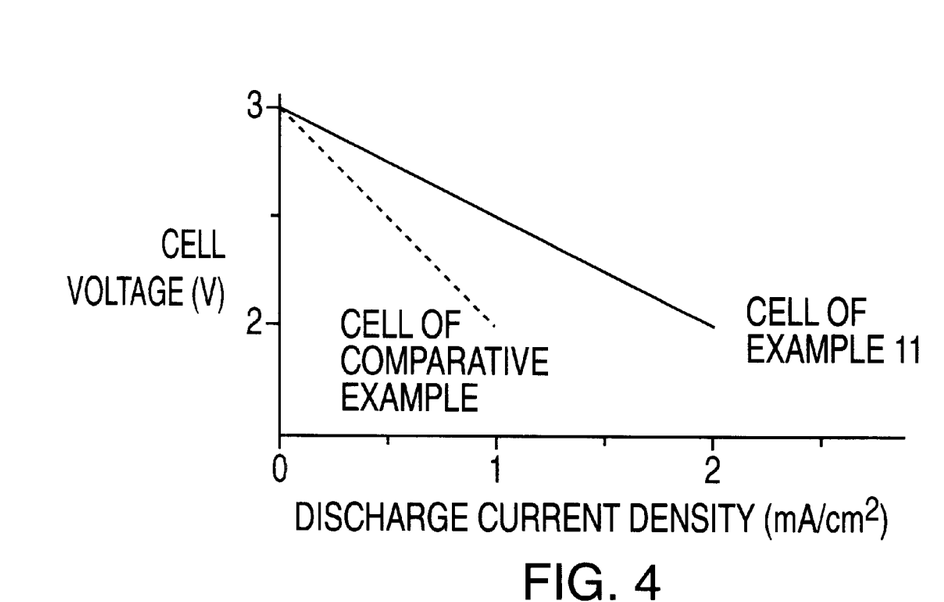
FIG. 4 is a graph showing an effective discharge characteristic of the cell shown in FIG. 2.

Effective discharge characteristics of the cell of FIG. 2 and the cell of the comparative example are shown in FIG. 4.

Example 12

Figure 3:
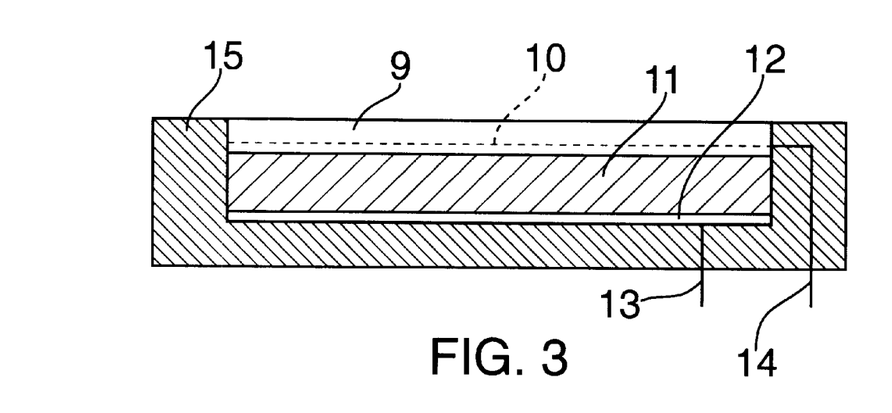
FIG. 3 is a sectional view showing an example of a gas sensor using a lithium ion conductive solid electrolyte of Example 4.

As a typical example of a gas sensor, an example of a carbon dioxide gas sensor using the lithium ion conductive glass-ceramic of Example 4 as a solid electrolyte is shown in section in FIG. 3. The upper and lower surfaces of a lithium ion conductive glass-ceramic layer 11 are polished to provide the layer 11 having a thickness of 1 mm to 2 mm, preferably 1 mm or below and more preferably 0.5 mm or below. On one of the surfaces of the layer 11 (the upper surface in the illustrated example) is formed, by ion spattering, a layer of metal carbonate, preferably lithium carbonate or a mixture of lithium carbonate and other carbonate. A platinum mesh 10 to which a lead 14 is connected is disposed on the surface of this metal carbonate layer to form an electrode. Then, a layer 9 of metal carbonate is formed on the upper surface of the electrode 10 to fix the electrode 10. On the other surface (the lower surface in the illustrated example) of the lithium ion conductive layer 11 is formed, by evaporation, a platinum thin film to form an electrode 12 and a lead 13 is connected to the electrode 12. According to this sensor, an electromotive force corresponding to the concentration of carbon dioxide gas is produced between the two electrodes due to dissociation equilibrium of the carbonate by the carbon dioxide gas in a mixture gas including the carbon dioxide gas and, therefore, the concentration of the carbon dioxide gas can be detected by measuring this electromotive force.

Forming of the carbonate layer and the electrode layers is not limited to the above method but these layers may be formed by other known methods including CVD, screen printing, sol-gel method, ion plating, ion beam evaporation, MBE, vacuum evaporation and electron beam evaporation.

Figure 5:
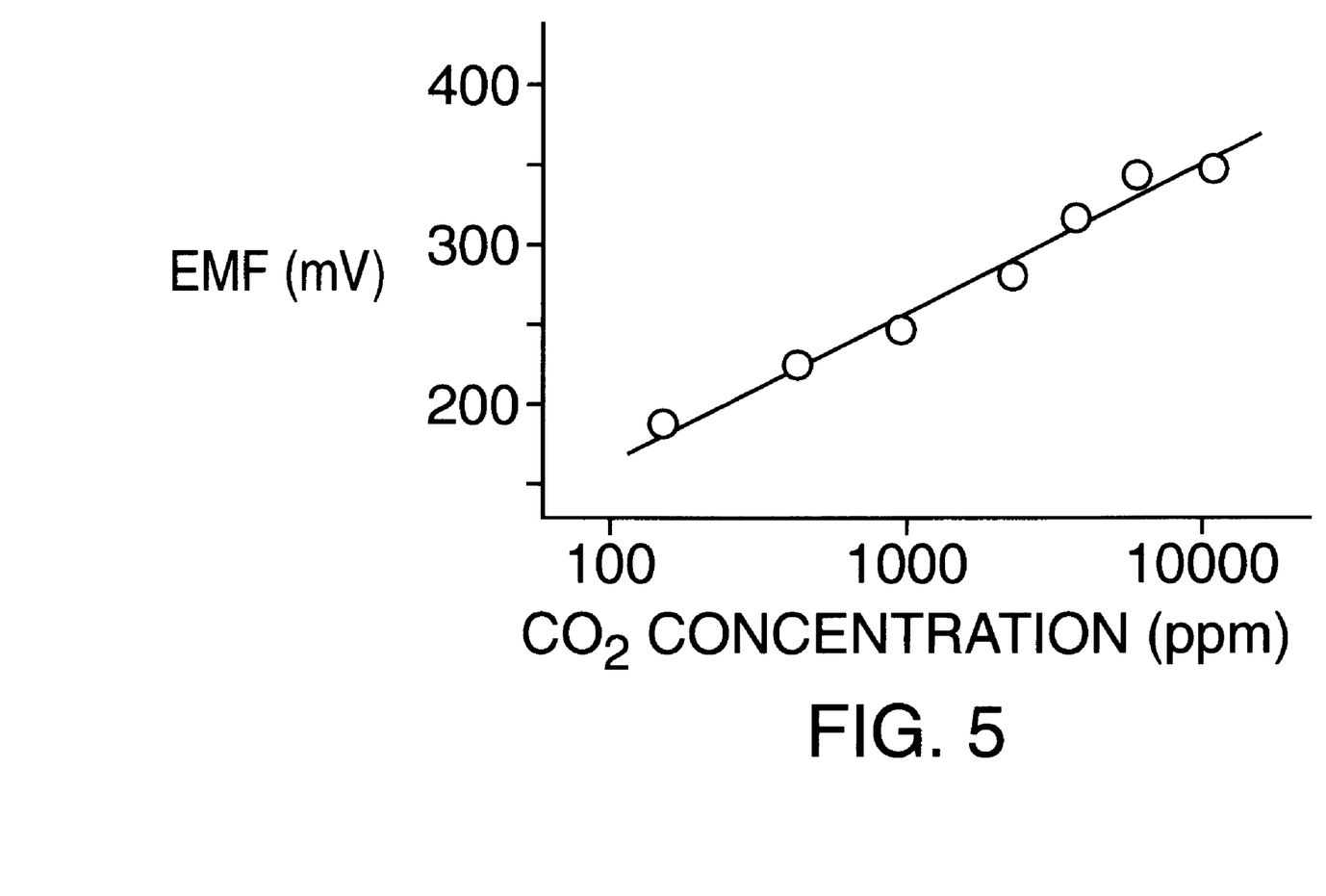
FIG. 5 is a graph showing an electromotive force characteristic by a carbonate gas partial pressure at room temperature of the gas sensor shown in FIG. 3.

The electromotive force characteristic by a carbonate gas partial pressure at room temperature of this glass-ceramic is shown in FIG. 5.

2. Examples of the glass-ceramics of the $Li_{1+x}Ti_2Si_xP_{3-x}O_{12}$ crystal phase Example 13

As starting materials, $NH_4H_2PO_4$, $SiO_2$, $TiO_2$, $AL(OH)_3$ and $Li_2CO_3$ were used. These starting materials were weighed to constitute a composition of 37.1% $P_2O_5$, 9.5% $SiO_2$, 40.6% $TiO_2$ and 12.8% $Li_2$ in mol %. The materials were mixed uniformly and then put in a platinum crucible and heated and melted in an electric furnace. First, $CO_2$, $NH_3$ and $H_2O$ coming from the raw materials were evaporated at 700° C. Then the temperature was raised to 1450° C. and the materials were melted by heating them at this temperature for 1.5 hour. Thereafter, the melt was cast onto a preheated stainless steel plate to form a uniform sheet glass. The glass was annealed at 550° C. for two hours for removing thermal stress of the glass.

Figure 6:
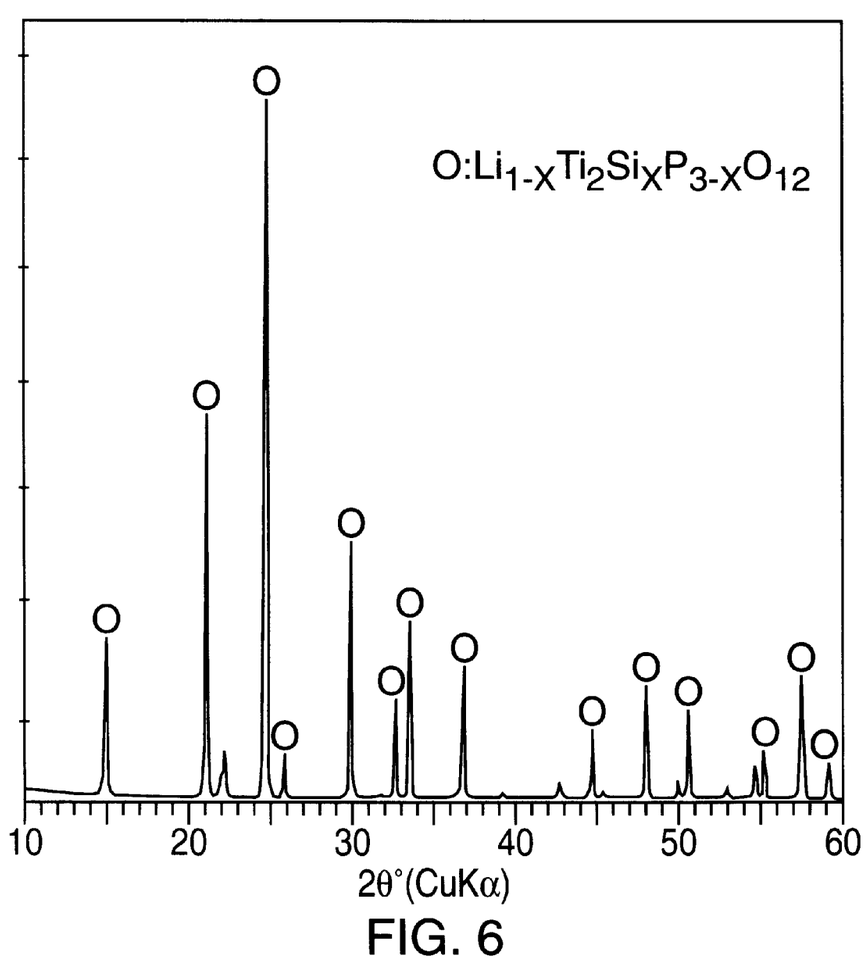
FIG. 6 is a graph showing an X-ray diffraction pattern of Example 13.

The glass thus produced was subjected to heat treatment at 1000° C. for fifteen hours and, as a result, a desired glass-ceramic was produced. The crystal phase which precipitated in the specimens was determined by the powder X-ray diffraction method. As a result, it was found that the precipitated crystal phase was $Li_{1+x}Ti_2Si_xP_{3-x}O_{12}$. An X-ray diffraction pattern of this glass-ceramic is shown in FIG. 6. This glass-ceramic ceramic exhibited a high conductivity of $2.0 \times 10^{-4}$ S/cm at room temperature.

Examples 14 to 17

Glass-ceramics of Examples 14 to 17 were prepared by employing the same method as the one employed in preparing the glass-ceramic of Example 13. The compositions and conductivity at room temperature of Examples 13 to 17 are shown in Table 3.

The conductivity of these Examples were measured by the same method as the one employed in Examples 1 to 10.

TABLE 3

| Example No. | 13 | 14 | 15 | 16 | 17 |
|---|---|---|---|---|---|
| $Li_2O$ (mol %) | 12.8 | 12.8 | 14.8 | 14.8 | 10.8 |
| $TiO_2$ (mol %) | 42.6 | 40.6 | 40.6 | 40.6 | 42.6 |
| $SiO_2$ (mol %) | 9.5 | 9.5 | 7.5 | 9.5 | 11.5 |
| $P_2O_5$ (mol %) | 35.1 | 37.1 | 37.1 | 35.1 | 35.1 |
| Conductivity | $2.0 \times 10^{-4}$ S/cm | $1.0 \times 10^{-4}$ S/cm | $6.0 \times 10^{-5}$ S/cm | $5.0 \times 10^{-5}$ S/cm | $5.1 \times 10^{-6}$ S/cm |

Example 18

Figure 7:
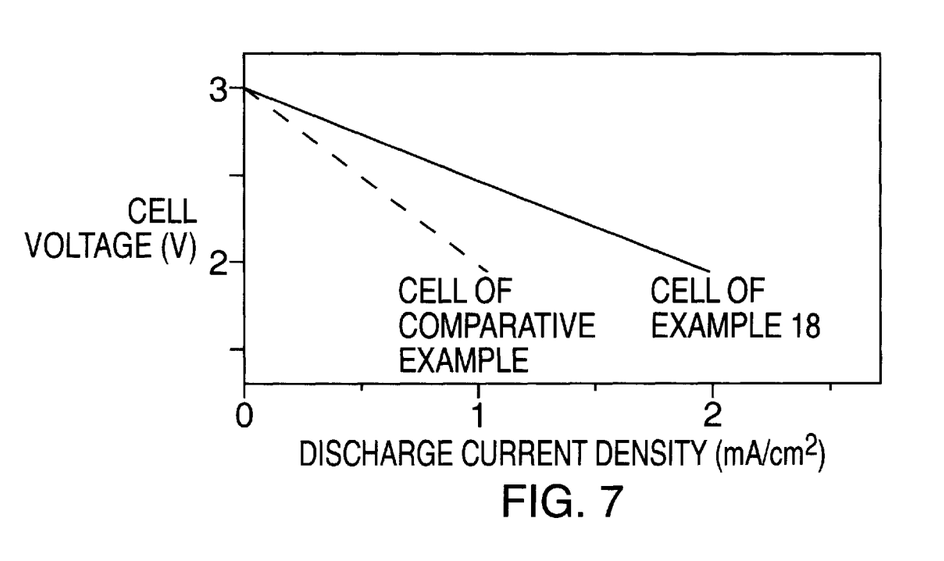
FIG. 7 is a graph showing an effective discharge characteristic of the cell using the glass-ceramic of Example 14.

A lithium cell was produced by using the glass-ceramic of Example 14 as its solid electrolyte and using a cell structure which is the same as the cell structure of Example 11. Effective discharge characteristics of this cell and the cell of the comparative example which is the same as the comparative example employed in Example 11 are shown in FIG. 7.

Example 19

Figure 8:
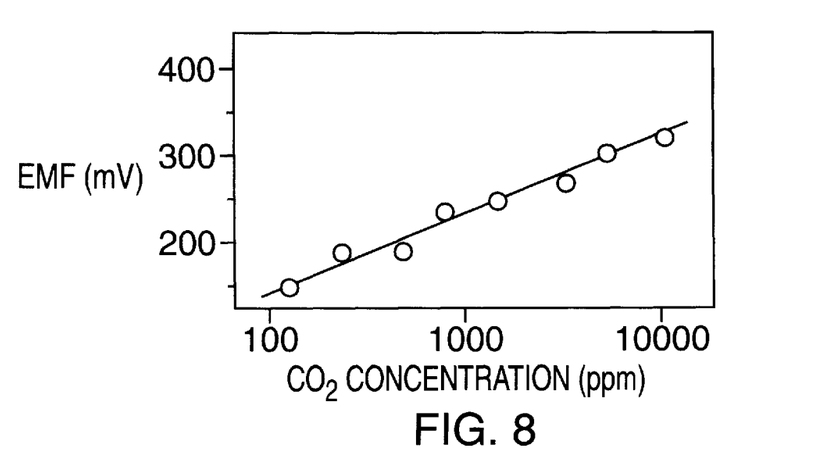
FIG. 8 is a graph showing an electromotive force characteristic by a carbonate gas partial pressure at room temperature of the gas sensor using the glass-ceramic of Example 14.

A gas sensor was produced by using the glass-ceramic of Example 14 as its solid electrolyte and using the same gas sensor structure as the one used in Example 12. Electromotive force characteristic by a carbonate gas partial pressure at room temperature of this gas sensor is shown in FIG. 8.

What is claimed is:

1. Lithium ion conductive glass-ceramics comprising in mol %:

| | |
|---|---|
| $P_2O_5$ | 35–40% |
| $SiO_2$ | 0–15 |
| $GeO_2 + TiO_2$ | 25–50% |
| in which $GeO_2$ | >0 and up to but not greater than 50% |
| and $TiO_2$ | 0 and up to but not greater than 50% |
| $ZrO_2$ | 0–10% |
| $M_2O_3$ (where M is one or two selected from the group consisting of Al and Ga) $Li_2O$ | 0.5–15% |
| $Li_2O$ | 10–25% | and containing $Li_{1+X}M_X(Ge_{1-Y}Ti_Y)_{2-X}(PO_4)_3$ (where $0 < X \leq 0.8$ and $0 \leq Y < 1.0$) as a main crystal phase.

2. Glass ceramics as defined in claim 1 wherein said glass-ceramics comprise in mol %:

| | |
|---|---|
| $P_2O_5$ | 35–40% |
| $SiO_2$ | 0–15% |
| $GeO_2 + TiO_2$ | 25–45% |
| in which $GeO_2$ | >0 and up to but not greater than 45% |
| and $TiO_2$ | 0 and up to but not greater than 45% |
| $ZrO_2$ | 0–10% |
| $Al_2O_3$ | 0.5–15% |
| $Li_2O$ | 10–25% | and containing $Li_{1+X}Al_X(Ge_{1-Y}Ti_Y)_{2-X}(PO_4)_3$ (where $0 < X \leq 0.8$ and $0 \leq Y < 1.0$) as a main crystal phase.

3. Glass ceramics as defined in claim 1 wherein said glass-ceramics comprise in mol %:

| | |
|---|---|
| $P_2O_5$ | 35–40% |
| $SiO_2$ | 0–15% |
| $GeO_2 + TiO_2$ | 25–45% |
| in which $GeO_2$ | >0 and up to but not greater than 45% |
| and $TiO_2$ | 0 and up to but not greater than 45% |
| $ZrO_2$ | 0–10% |
| $Al_2O_3$ | 0.5–15% |
| $Li_2O$ | 10–25% | and containing $Li_{1+X}AL_X(Ge_{1-Y}Ti_Y)_{2-X}(PO_4)_3$ (where $0 < X \leq 0.8$ and $0 \leq Y < 1.0$) as a main crystal phase.

4. Lithium ion conductive glass-ceramics comprising $Li_{1+X}M_X(Ge_{1-Y}Ti_Y)_{2-X}(PO_4)_3$ (where M is one or two selected from the group consisting of Al and Ga, $0 < X \leq 0.8$ and $0 \leq Y < 1.0$) as a main crystal phase.

5. Lithium ion conductive glass-ceramics comprising in mol %:

| | |
|---|---|
| $P_2O_5$ | 32–40% |
| $SiO_2$ | 7–14% |
| $TiO_2$ | 38–45% |
| $Li_2O$ | 10–18% | and containing $Li_{1+X}Ti_2Si_XP_{3-X}O_{12}$ (where X>0) as a main crystal phase.

6. Lithium ion conductive glass-ceramics containing $Li_{1+X} Ti_2Si_XP_{3-X}O_{12}$ (where X>0) as a main crystal phase.

7. A solid electric cell comprising a case, a negative electrode, a positive electrode and a solid electrolyte the negative electrode, positive electrode and solid electrolyte being disposed in the case in such a manner that the negative electrode opposes the positive electrode through the solid electrolyte and wherein said the solid electrolyte is made of lithium ion conductive glass-ceramic comprising in mol %:

| | |
|---|---|
| $P_2O_5$ | 35–40% |
| $SiO_2$ | 0–15% |
| $GeO_2 + TiO_2$ | 25–50% |
| in which $GeO_2$ | >0 and up to but not greater than 50% |
| and $TiO_2$ | 0 and up to but not greater than 50% |
| $ZrO_2$ | 0–10% |
| $M_2O_3$ (where M is one or two selected from the group consisting of Al and Ga) | 0.5–15% |
| LiO | 10–25% | and containing $Li_{1+X}M_X(Ge_{1-Y}Ti_Y)_{2-X}(PO_4)_3$ (where $0 < x \leq 0.8$ and $0 \leq Y < 1.0$) as a main crystal phase.

8. A solid electric cell comprising a case, a negative electrode, a positive electrode and a solid electrolyte the negative electrode, positive electrode and solid electrolyte being disposed in the case in such a manner that the negative electrode opposes the positive electrode through the solid electrolyte and wherein said solid electrolyte is made of lithium ion conductive glass-ceramic containing $Li_{1+X}M_X(Ge_{1-Y}Ti_Y)_{2-X}(PO_4)_3$ (where M is one or two selected from the group consisting of Al and Ga, $0<x\leq0.8$ and $0\leq Y<1.0$) as a main crystal phase.

9. A solid electric cell comprising a case, a negative electrode, a positive electrode and a solid electrolyte the negative electrode, positive electrode and solid electrolyte being disposed in the case in such a manner that the negative electrode opposes the positive electrode through the solid electrolyte and wherein said solid electrolyte is made of lithium ion conductive glass-ceramic comprising in mol %:

| | |
|---|---|
| $P_2O_5$ | 32–40% |
| $SiO_2$ | 7–14% |
| $TiO_2$ | 38–45% |
| $Li_2O$ | 10–18% | and containing $Li_{1+x}Ti_2Si_xP_{3-x}O_{12}$ (where x>0) as a main crystal phase.

10. A solid electric cell comprising a case, a negative electrode, a positive electrode and a solid electrolyte the negative electrode, positive electrode and solid electrolyte being disposed in the case in such a manner that the negative electrode opposes the positive electrode through the solid electrolyte and wherein said solid electrolyte is made of lithium ion conductive glass-ceramic containing $Li_{1+x}Ti_2Si_xP_{3-x}O_{12}$ (where x>0) as a main crystal phase.

11. A gas sensor comprising a case, a negative electrode, a positive electrode, a solid electrolyte and a layer for which an electromotive force corresponding to the concentration of the gas is produced between the two electrodes, a lead connected to the negative electrode and a lead connected to the positive electrode, the negative electrode, positive electrode and solid electrolyte being disposed in the case in such a manner that the negative electrode opposes the positive electrode through the solid electrolyte and wherein said solid electrolyte is made of lithium ion conductive glass-ceramic comprising in mol %:

| | |
|---|---|
| $P_2O_5$ | 35–40% |
| $SiO_2$ | 0–15% |
| $GeO_2 + TiO_2$ | 25–50% |
| in which $GeO_2$ | >0 and up to but not greater than 50% |
| and $TiO_2$ | 0 and up to but not greater than 50% |
| $ZrO_2$ | 0–10% |
| $M_2O_3$ (where M is one or two selected from the group consisting of Al and Ga) | 0.5–15% |
| LiO | 10–25% | and containing $Li_{1+X}M_X(Ge_{1-Y}Ti_Y)_{2-X}(PO_4)_3$ (where $0<x\leq0.8$ and $0\leq Y<1.0$) as a main crystal phase.

12. A gas sensor comprising a case, a negative electrode, a positive electrode, a solid electrolyte and a layer for which an electromotive force corresponding to the concentration of the gas is produced between the two electrodes, a lead connected to the negative electrode and a lead connected to the positive electrode, the negative electrode, positive electrode and solid electrolyte being disposed in the case in such a manner that the negative electrode opposes the positive electrode through the solid electrolyte and wherein said solid electrolyte is made of lithium ion conductive glass-ceramic containing $Li_{1+X}M_X(Ge_{1-Y}Ti_Y)_{2-X}(PO_4)_3$ (where M is one or two and is selected from the group consisting of Al and Ga, $0<x\leq0.8$ and $0\leq Y<1.0$) as a main crystal phase.

13. A gas sensor comprising a case, a negative electrode, a positive electrode, a solid electrolyte and a layer for which an electromotive force corresponding to the concentration of the gas is produced between the two electrodes, a lead connected to the negative electrode and a lead connected to the positive electrode, the negative electrode, positive electrode and solid electrolyte being disposed in the case in such a manner that the negative electrode opposes the positive electrode through the solid electrolyte and wherein said solid electrolyte is made of lithium ion conductive glass-ceramic comprising in mol %:

| | |
|---|---|
| $P_2O_5$ | 32–40% |
| $SiO_2$ | 7–14% |
| $TiO_2$ | 38–45% |
| LiO | 10–18% | and containing $Li_{1+x}Ti_2Si_xP_{3-x}O_{12}$ (where x>0) as a main crystal phase.

14. A gas sensor comprising a case, a negative electrode, a positive electrode, a solid electrolyte and a layer for which an electromotive force corresponding to the concentration of the gas is produced between the two electrodes, a lead connected to the negative electrode and a lead connected to the positive electrode, the negative electrode, positive electrode and solid electrolyte being disposed in the case in such a manner that the negative electrode opposes the positive electrode through the solid electrolyte and wherein said solid electrolyte is made of lithium ion conductive glass-ceramic containing $Li_{1+x}Ti_2Si_xP_{3-x}O_{12}$ (where x>0) as a main crystal phase.

15. A gas sensor as defined in claim 11 wherein said gas sensor is a carbon dioxide gas sensor and said layer is a metal carbonate.

16. A gas sensor as defined in claim 12 wherein said gas sensor is a carbon dioxide gas sensor and said layer is a metal carbonate.

17. A gas sensor as defined in claim 13 wherein said gas sensor is a carbon dioxide gas sensor and said layer is a metal carbonate.

18. A gas sensor as defined in claim 14 wherein said gas sensor is a carbon dioxide gas sensor and said layer is a metal carbonate.

* * * * *